Jan. 17, 1933.   O. C. DURYEA   1,894,554
CAR CONSTRUCTION
Original Filed March 1, 1926   5 Sheets-Sheet 1
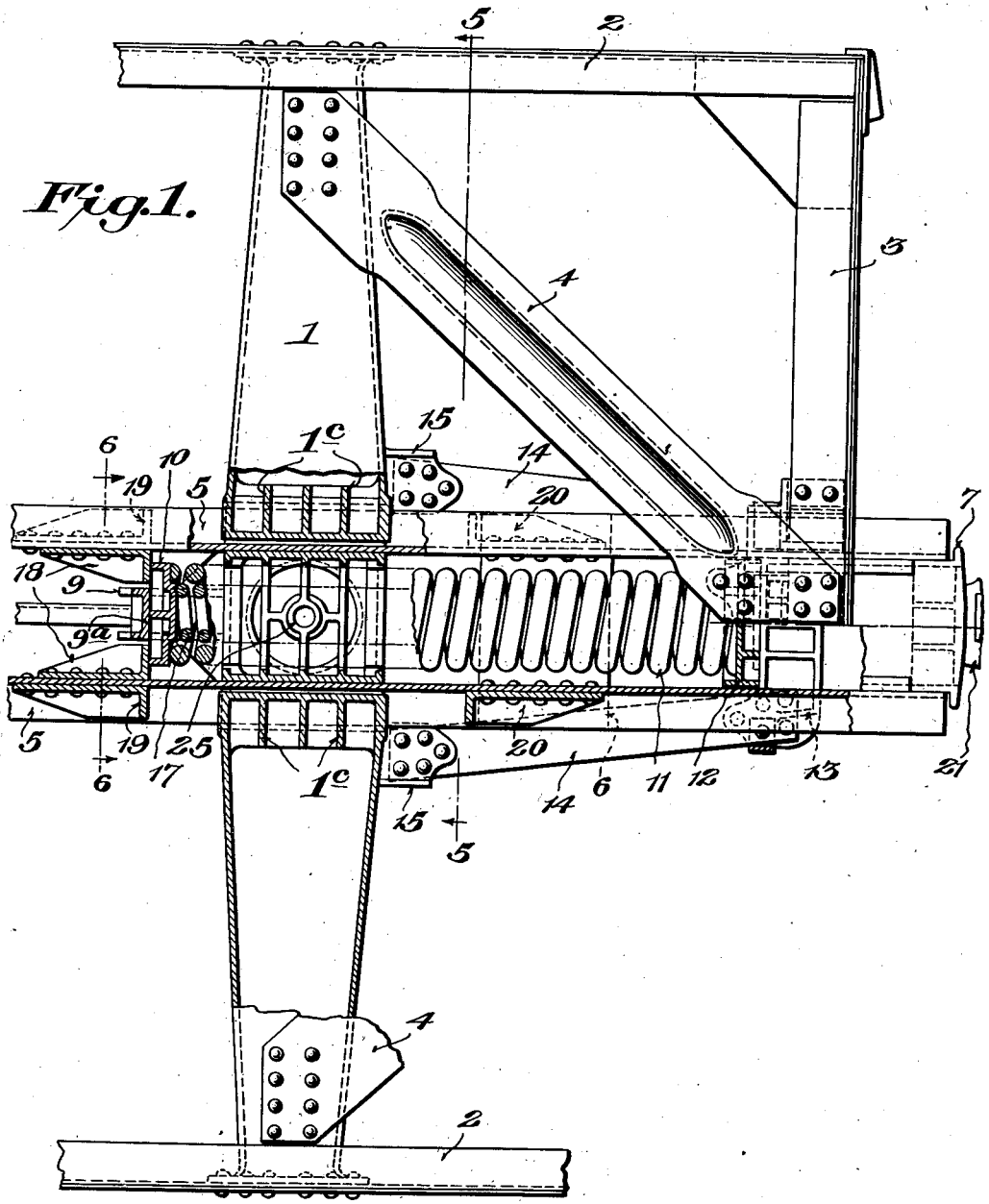
Inventor
Otho C. Duryea
By
Mauro, Cameron, Lewis & Kerkam.
Attorneys

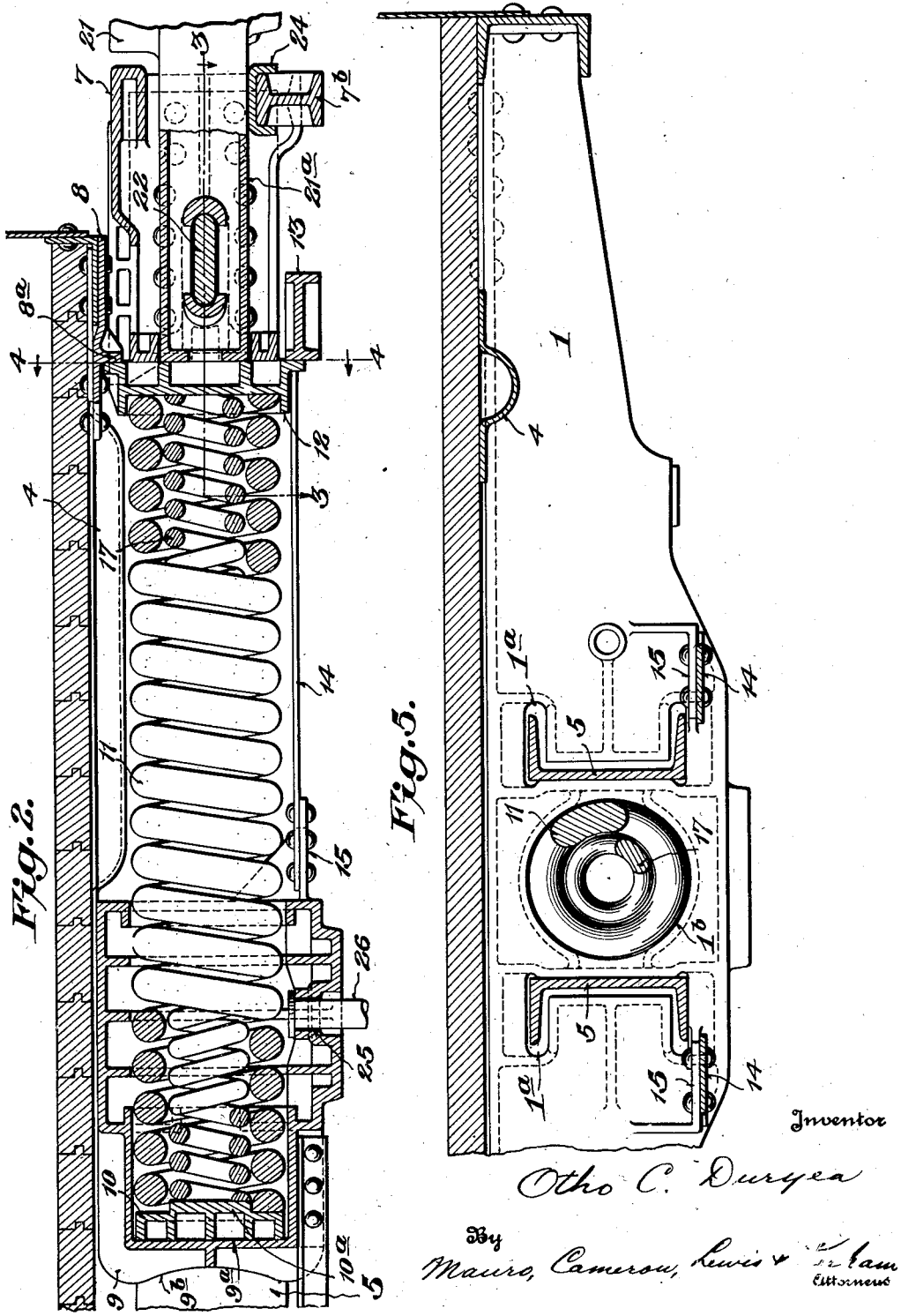

Jan. 17, 1933.   O. C. DURYEA   1,894,554
CAR CONSTRUCTION
Original Filed March 1, 1926   5 Sheets-Sheet 3
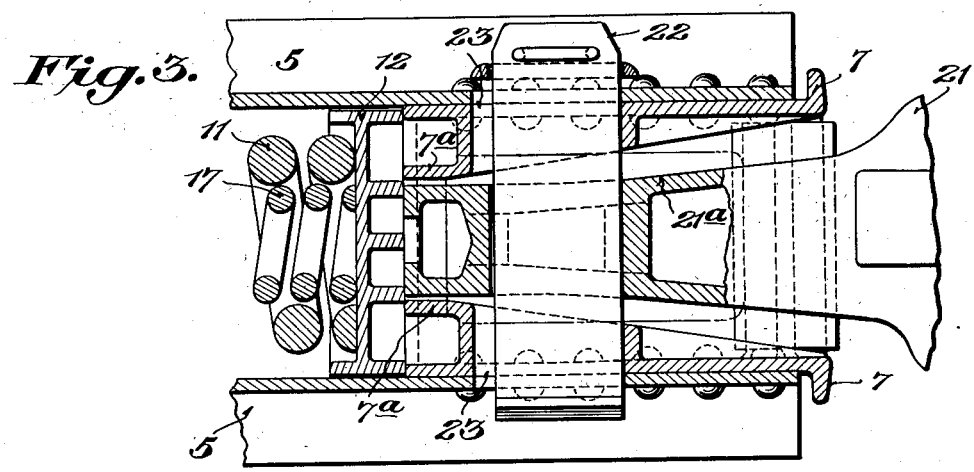
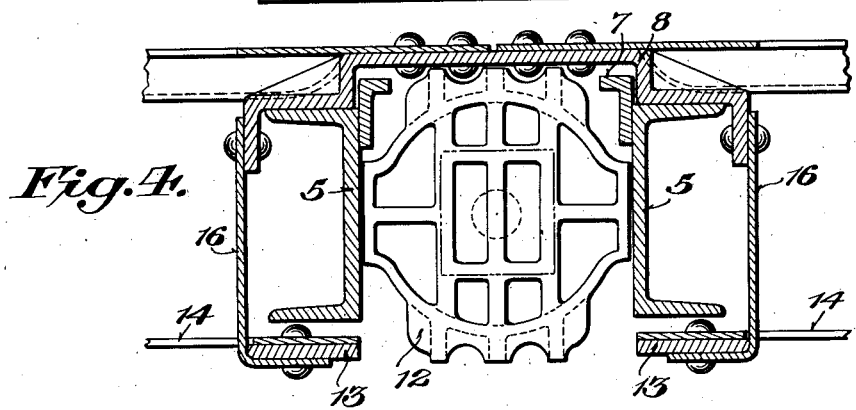
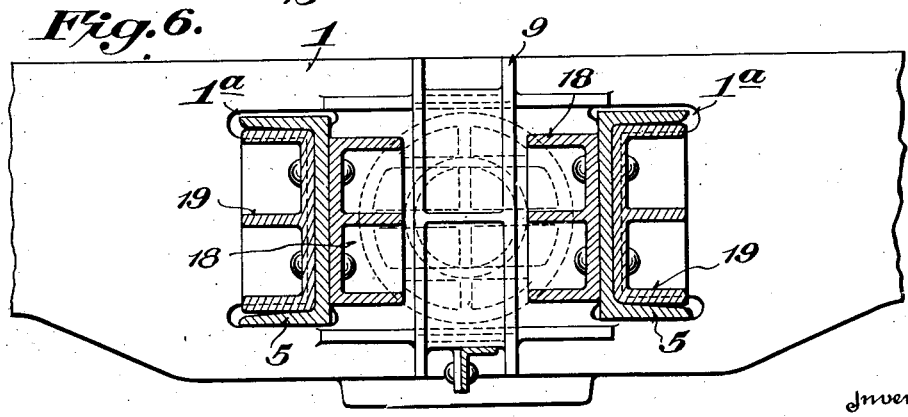

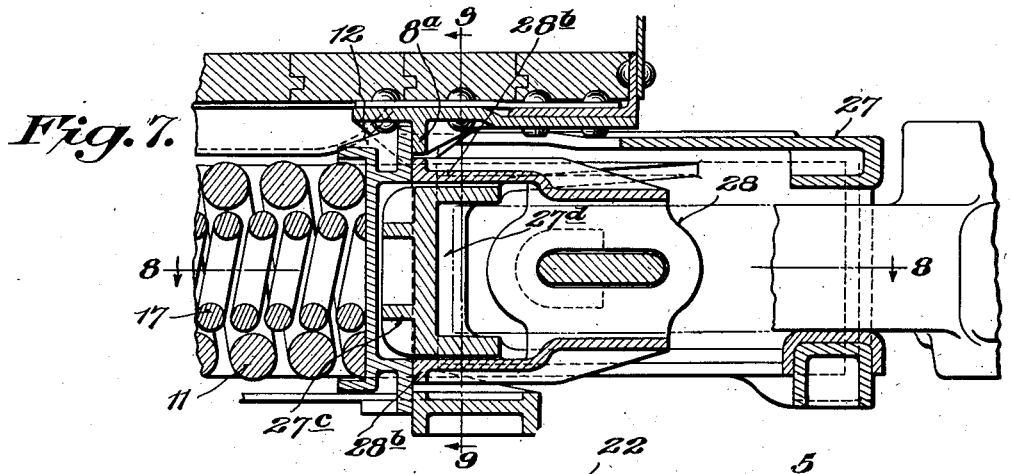
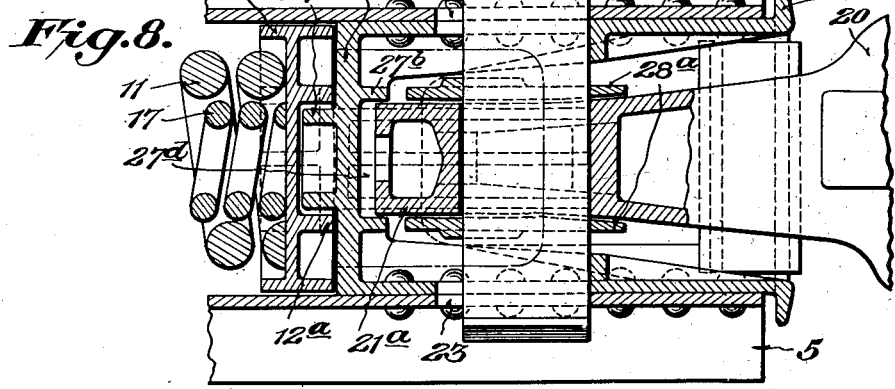
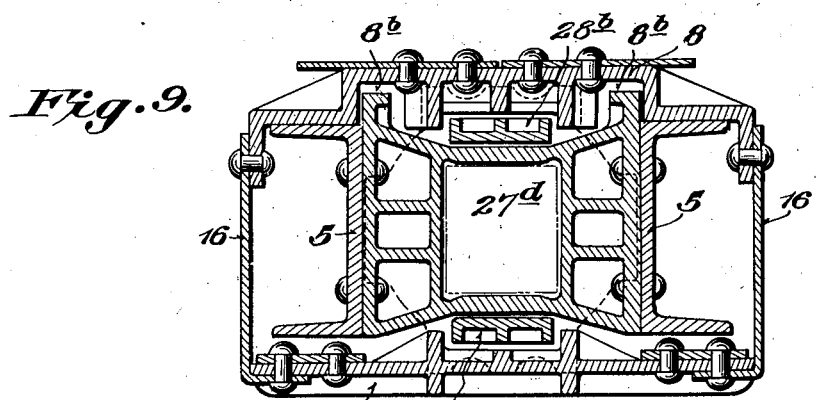

Jan. 17, 1933. O. C. DURYEA 1,894,554
CAR CONSTRUCTION
Original Filed March 1, 1926   5 Sheets-Sheet 5
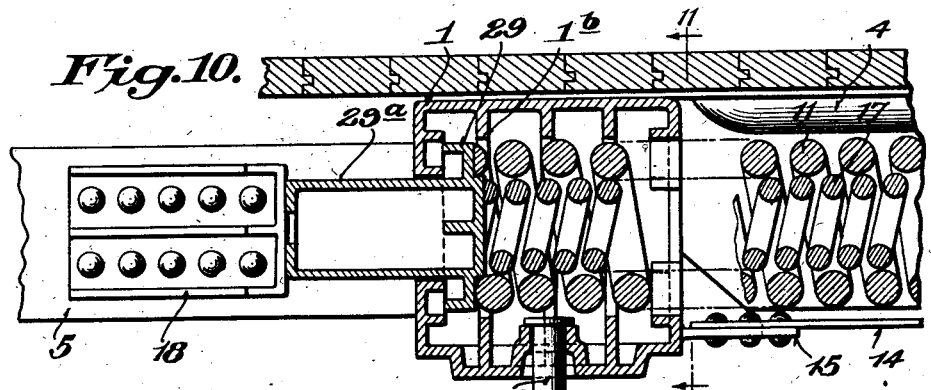
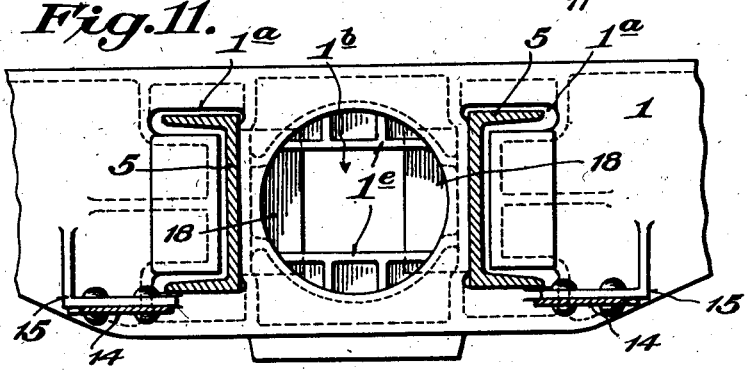
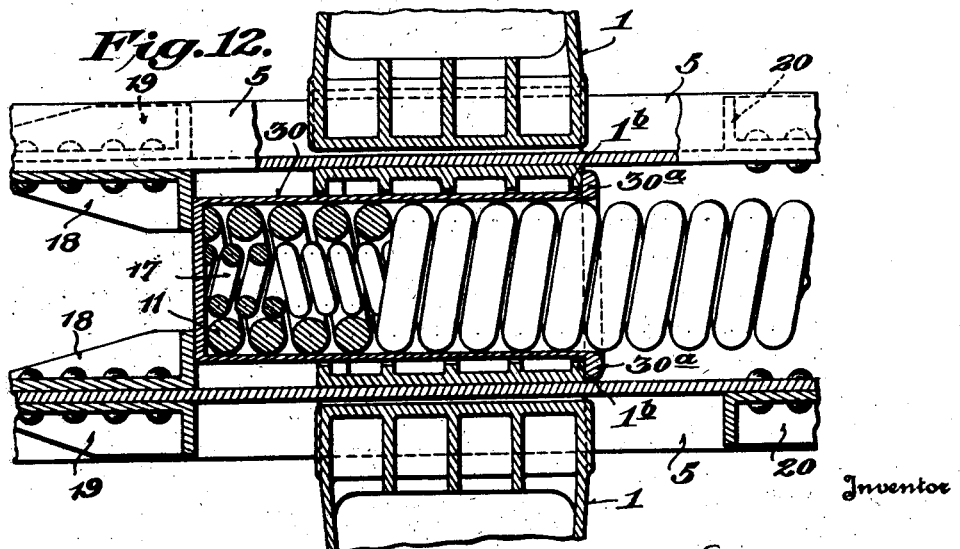

Patented Jan. 17, 1933

1,894,554

UNITED STATES PATENT OFFICE

OTHO C. DURYEA, OF WATERBURY, CONNECTICUT, ASSIGNOR TO O. C. DURYEA CORPORATION, OF WILMINGTON, DELAWARE, A CORPORATION OF DELAWARE

CAR CONSTRUCTION

Application filed March 1, 1926, Serial No. 91,613. Renewed March 25, 1932.

This invention relates to railway rolling stock, and more particularly to a car structure of the type disclosed in my application Serial No. 84,737, filed January 29, 1926, wherein a long travel longitudinal member is mounted for movement relative to the car structure, and resilient means of long travel are provided for resisting said relative movement.

Railway cars now in use are provided adjacent the opposite ends with shock absorbing means of very limited travel, this being due primarily to the necessity for preventing excessive train slack. Because of the limited travel of these shock absorbing devices, the same are ineffective for absorbing the force of blows or buffing shocks imparted to the car under usual operating conditions, and damage to the car structure and the lading results.

Railway car construction is standardized as respects certain features. For example, box cars are generally constructed so that the distance from the center of the body bolster to the end sill is 4½ to 5 feet. This distance cannot be greatly changed for reasons well known in the art. For example, in cars of the hopper type any increase in the overhang—the distance between the bolster and the adjacent end of the car—greatly reduces the cubical capacity of the same. The usual shock absorbing means heretofore employed is so relatively small, however, that little difficulty is involved in mounting the same in this limited space between the bolster and the adjacent end sill.

On the other hand, many difficulties are encountered in providing a car structure embodying a long travel center member, of the type disclosed in my application referred to above, when it is desired to mount, adjacent the ends of the car, the means of long travel for yieldingly resisting relative movement of the longitudinal member. Among other reasons, these difficulties are due to the small space available between the bolster and the adjacent end sill.

An object of the present invention is to provide a novel railway car structure embodying a long travel center draft and buffing member in combination with means of long travel for yieldingly resisting relative movement of said center member.

Another object of this invention is to provide a car structure of the above type embodying novel means for mounting one or more resilient elements adjacent the opposite ends of the car body whereby relative movement of the long travel center member is resisted.

Another object is to provide a car structure of the long travel center member type wherein the resilient member or members, employed for resisting relative movement of the center member, or the elements directly associated therewith, may extend through the body bolster, thereby permitting the resilient means of long travel to be mounted adjacent the end sills.

Another object is to provide a novel body bolster.

A further object is to provide novel means for operatively associating the coupler with the center member and the resilient element or elements whereby a predetermined amount of train slack is provided. These and other objects will appear more fully hereinafter.

Several embodiments of the present invention are illustrated in the accompanying drawings but it is to be expressly understood that these drawings are for the purpose of illustration only and are not designed as a definition of the limits of the invention, reference being had to the appended claims for this purpose.

In the drawings, wherein like reference characters refer to like parts throughout the several views,—

Fig. 1 is a top plan view, partly in section, and with parts broken away in order to employ a large scale, illustrating one embodiment of the present invention;

Fig. 2 is a longitudinal sectional view of the parts illustrated in Fig. 1;

Fig. 3 is a detail sectional view illustrating novel means whereby the coupler may be associated with the center member and the resilient means;

Fig. 4 is a transverse section taken on the line 4—4 of Fig. 2; and

Figs. 5 and 6 are sections taken on the lines 5—5 and 6—6 respectively, of Fig. 1.

Fig. 7 is a detail side view, in section, illustrating one embodiment of means which may be employed in accordance with the present invention for associating the coupler means with the center member and resilient means; and Figs. 8 and 9 are detail sections taken on the lines 8—8 and 9—9 respectively, of Fig. 7.

Fig. 10 is a detail side view, in section, illustrating another embodiment of the means which may be employed for operatively associating the resilient means with the bolster; and Fig. 11 is a transverse section taken on the line 11—11 of Fig. 10.

Fig. 12 is a detail top plan view, in section, illustrating another embodiment of the means which may be employed for operatively connecting the resilient means with the bolster.

Referring to the embodiment of the invention illustrated in Figs. 1 to 6 inclusive, the car structure constituting the subject matter of the present invention includes a pair of body bolsters 1 which are adapted to be mounted on truck bolsters and trucks (not shown) in any suitable manner well known in the art. In order to employ a large scale for the drawings, only one end of the car structure is illustrated but it will be understood that the elements at the opposite end of the car are similar to those illustrated in Fig. 1 except that said elements in certain instances have their relative position reversed, as will be readily understood by those skilled in the art. As shown more clearly in Fig. 5, the novel body bolster 1, which is preferably formed as a casting, is provided at the central portion thereof with three transverse openings 1a, 1a and 1b, for a purpose to be described more fully hereinafter and with suitable strengthening ribs 1c. Secured in any suitable manner, as by means of rivets, to the opposite ends of the bolster 1, are side sills 2 that are connected at their extremities by an end sill 3.

In order to give the underframe and body structure sufficient rigidity and to prevent the same from being thrown out of line, diagonal braces 4, 4 are preferably secured at their outer ends to the upper surface of the central portion of end sill 3 and at their inner ends to the upper surface of the outer portions of the bolster 1. Braces 4 strengthen end sill 3 and prevent the same from yielding under ends stresses, and at the same time permit yielding movement of the central portion of the bolster.

A long travel center member, which is mounted for longitudinal movement relative to the bolster, is preferably constituted by a pair of vertically disposed channel members 5 that are suitably strengthened and maintained in spaced relation at a plurality of points as by means of a carrier iron 6 that is secured at its opposite ends to the channel members, and as by means of a striking plate 7 which is rigidly attached to said members 5. Preferably the latter extend throughout the length of the car and pass through the openings 1a in bolster 1. The center member is engaged and guided at its end portion by means of a guide 8 that is preferably secured to the lower face of end sill 3 at the central portion thereof.

In order that forces imparted to the car structure, such for example as those resulting from "buffing", may be gradually and yieldingly resisted without damage to the car or its lading, the center member 5, 5 is adapted for longitudinal movement of relatively great extent and long travel means are provided for yieldingly resisting this relative movement. Preferably the long travel resilient means are mounted adjacent the end sill to facilitate assembly and to avoid the necessity of providing additional resilient elements for the coupler means. As shown more clearly in Figs. 1 and 2, the bolster is provided on the inner face thereof with a vertically disposed yoke 9 which projects inwardly toward the center of the car structure from the inner face of the bolster, and which may be cast integrally with, or fixedly attached to the same. Bearing against the inner face 9a of the vertically disposed portion 9b of said yoke is a follower plate 10 which is preferably formed as a circular disk provided on its outer face with a centering boss 10a. Surrounding the boss 10a and in engagement with the follower 10, is a coil spring 11 which extends through the opening 1b in the bolster outwardly into engagement with a spring follower 12, the upper portion of which is normally maintained by said spring 11 in abutting engagement with a stop lug 8a, (Fig. 2) formed on the guide 8. The lower portion of the outer face of follower 12 is normally maintained by spring 11 in abutting engagement with a transverse beam 13 which is held against longitudinal movement by tension members 14 that are rigidly attached at their outer ends to beam 13 and at their inner ends to the bolster 1. If desired, said bolster may be provided with laterally projecting lugs 15 to facilitate the attachment thereto of said tension members. Beam 13 is held against movement in a vertical plane by means of rigidly attached hanger irons 16 (Fig. 4) that are secured at their upper ends to guide 8.

In the illustrated embodiment of the invention, a second coil spring 17 extends from centering boss 10a to spring follower 12 within the resilient member 11. It is to be expressly understood, however, that the invention is not limited to the use of two concentrically disposed resilient members since it will be apparent to those skilled in the art that the inner member may be dispensed with or a plurality of resilient members may be disposed within the spring 11. It will also be understood that the resilient means employed need not be an integral member or members but may be constituted by a plurality of elements.

Stop lugs 18 are preferably secured to the inner faces of the webs of channels 5 in such a position as to normally engage the inner face of follower plate 10. Additional stop lugs 19, 19 and 20, 20 may be suitably secured to the channels 5 on the opposite sides of bolster 1 for positively limiting the relative movement of the center member and for preventing the resilient means from going solid.

Coupler means are associated with the center member and the resilient means whereby a predetermined and limited amount of train slack is secured. As illustrated, a coupler 21 (Fig. 3) having the usual shank 21a is secured, as by means of a key 22, to the center member. Key 22 extends through openings 23 formed in the channels 5 and striking plate 7, the width of said openings being greater than the width of key 22. The inner end of the coupler shank bears directly against the outer face of follower 12 and is guided by the inner ribbed portion 7a of the striking plate. The latter preferably extends beyond the outer ends of channels 5 and is provided on the lower side thereof with a transverse portion 7b (Fig. 2) having substantially the form of an I beam in section. A suitable wear plate 24 may be interposed between the coupler shank and the portion 7b. An opening 25 is preferably provided in a boss formed in the lower portion of bolster 1 to receive a center pin 26 for a purpose well understood in the art. This center pin terminates at its upper end below the resilient means employed for resisting relative movement of the center member.

If a buffing force is imparted to the car structure through coupler 21, movement of the key and coupler relative to the center member is yieldingly resisted by the resilient member 11 and also by resilient member 17, if the latter is employed to increase the total capacity of the yielding means since the inner end of the coupler shank forces follower 12 to the left, as viewed in Figs. 1 and 2, to compress the resilient means. The latter is held against movement at its opposite end by follower 10 and yoke 9. Relative movement between the coupler shank and the center member is positively limited by engagement of key 22 with the inner walls of openings 23, which engagement takes place very slightly in advance of the engagement of the horns of the coupler with the outer end of the striking plate 7. It will therefore be apparent that a predetermined and limited amount of train slack is provided. If the buffing force is sufficiently great, the coupler means, after going solid, move to the left in unison with the center member which now moves relative to the bolster, and the resilient means is further compressed since the latter is held at its inner end by yoke 9. While the coupler and its key 22 are moving relative to the center member, the resilient means at the opposite end of the car is not affected and remains in its normal state. However, when the coupler and center member move in unison relative to the bolster, the resilient means at the opposite ends of the car coact to resist relative movement of said center member. As pointed out above, the bolster must occupy a certain position relative to the end sill, and in order to position the outer end of the resilient means adjacent the coupler means and at the same time secure long travel of the center member, the resilient means is extended through the bolster and means are provided for maintaining the resilient means in operative position. By this arrangement the travel of the center member may be made very great, since the yoke 9 may be extended inwardly toward the center of the car structure as desired, and the resilient means may be correspondingly lengthened.

Movement of the center member to the left relative to the bolster, as viewed in Fig. 1, is positively limited by stops 20 which are adapted to engage the outer face of the bolster 1, said stops being so positioned that the resilient means cannot go solid. Movement of the center member to the right relative to the bolster is positively limited by stops 19. In the form shown in Fig. 1, the stop members 18 are so positioned that they cannot move into abutting engagement with the rear face of the bolster, their primary function being that of picking up the follower plate 10 to compress the resilient means. It is to be expressly understood, however, that stops 19 may be eliminated and the members 18 may be adapted to engage the bolster to positively limit relative movement of the center member. It will also be apparent that the stop members 20 may be positioned between the webs of the channel members 5 instead of being mounted on their outer faces, as illustrated in Fig. 1. Friction means of the type disclosed in my application referred to above, may be employed for dissipating a portion of the energy tending to produce relative movement between the center member and the remainder of the car structure. Preferably said friction means are constituted by longitudinal stringers, of predetermined length, secured to the car flooring and having frictional engagement with the upper flanges of channels 5.

In Figs. 7 to 9 inclusive, there is disclosed another embodiment of the present invention wherein novel means are provided for associating the coupler means with the center member and with the long travel resilient means. Secured to the ends of channels 5 is a striking plate 27 which projects for a short distance beyond the outer ends of channels 5 and which is riveted to the webs of the latter and projects inwardly to the follower 12. Preferably the striking plate 27 is formed as a casting and the inner end of the same is provided with an end wall 27a constituting a transverse beam having suitable strengthening ribs 27b. The beam 27a extends from the web portion of one channel 5 to the web portion of the opposite channel and is provided on its inner face with a centering boss 27c which, as shown, is telescopically received by a boss 12a formed on the outer face of follower 12. The outer face of beam 27a is provided with a pocket 27d and into this pocket extends the inner end of the coupler shank 21a. The usual key 22 extends through the coupler shank and through openings 23 in the channel members 5 and in the lateral walls of the striking plate 27, the width of the openings 23 being greater than the width of the key. In engagement with the key, on the opposite sides of the coupler shank, are portions 28a of a substantially box-shaped casting 28 that is provided on its inner end with upper and lower, inwardly projecting portions 28b, which latter extend inwardly above and below the beam 27a of striking plate 27 (see particularly Figs. 7 and 9). The upper portion of striking plate 27 extends for a short distance above the upper flanges of the channels 5 into a pocket 8b formed in the guide 8 and thereby assist in preventing bending or twisting of the center member in a horizontal plane. Resilient means 11 and 17 act through follower 12 and projections 28b of member 28 to normally maintain key 22 and coupler 20 in their extreme outward position, as shown more clearly in Fig. 8. If a force be imparted to coupler 20 to move the same to the left relative to the center member, as viewed in Fig. 8, this movement is yieldingly resisted by the resilient means acting through the follower 12, member 28 and key 22. The inner end of the coupler shank is so positioned relative to the outer face of beam 27a that relative movement of the coupler is positively limited by engagement of said inner end of the coupler shank with the outer face of the beam. The width of openings 23 is sufficiently great to prevent the key 22 from striking the inner walls of said openings before the inner end of the coupler shank engages the beam 27a. Any force tending to move coupler 20 relative to the center member is partially absorbed by the resilient means 11, 17. The unabsorbed portion of this force is transmitted by the coupler shank to the beam 27a and thence to the center member tending to place the latter in motion. Any movement of the center member is transmitted through the resilient means to the entire car structure. An unusually strong structure is thus provided for transmitting any energy imparted to the coupler, and unabsorbed by the resilient means, to the center member. The key 22, it will be apparent, is primarily employed for retaining the coupler in position and for use in draft. A predetermined and limited amount of train slack is provided for and the resilient means employed for resisting relative longitudinal movement of the center member is also employed for yieldingly resisting relative movement of the coupler means. It is therefore unnecessary to provide separate resilient means for the coupler.

Referring of Figs. 10 and 11, illustrating another embodiment of the present invention, the resilient means 11 and 17 extend through the outer end of opening 1b in bolster 1 into engagement with the outer face of spring follower 29 which has engagement on its inner face with upper and lower segments 1e (Fig. 11) that are preferably integral with the bolster adjacent the inner face of the latter. The follower 29 is provided with a shank portion 29a which extends inwardly beyond the inner face of the bolster into engagement with stops 18. The follower 29 is slidably mounted in the opening 1b of the bolster and when a force is imparted to the center member, such as to move the latter to the right relative to the bolster, as viewed in Fig. 10, stops 18 force follower 29 to the right to compress the resilient means 11, 17 whereby relative movement of the center member is yieldingly resisted. Any tendency for the resilient means to move in the opposite direction, i. e., to the left as viewed in Fig. 10, is resisted by the follower 29 which has abutting engagement with the segments 1e of the bolster. The use of the follower 29, among other advantages, enables a bolster to be formed without providing projecting lugs or ears thereon, which facilitates casting or construction of the bolster. Moreover, great latitude is permitted in the length of the resilient means employed.

In Fig. 12 there is illustrated another embodiment of the present invention wherein the inner end or ends of the resilient means is operatively secured to the bolster 1 by means of a cup-shaped follower 30 which extends through the opening 1b in the bolster. In the form shown, the follower 30, which may be extruded if desired, is provided on its outer end with a substantially circular flange 30a which is normally held by the resilient means, which bear against the bottom of the follower, in engagement with the outer face portion immediately surrounding the opening 1b of the bolster. The inner end of follower 30 normally has abutting engagement with stops 18. Any force imparted to the coupler which tends to move the center member to the left, as viewed in Fig. 12, and consequently to move the resilient means to the left, is resisted by said resilient means, since the latter is held against movement by the follower 30. When a force is imparted to the center member tending to move it to the right, as viewed in Fig. 12, relative to the bolster 1, stops 18 force follower 30 to the right, thereby compressing the resilient means which are held against movement at their outer ends by the follower 12 described above.

It will thus be perceived that there is provided a car structure embodying a long travel center member wherein novel means are employed for associating the resilient means with the center member and bolsters. Said resilient means is positioned adjacent the coupler but, due to the novel manner in which said resilient means is operatively associated with the bolster, relatively great movement of the center member can be secured. Moreover, the length of the resilient member or members employed may be greatly varied and consequently the travel of the center member may be varied through wide limits. The mounting of the resilient members adjacent the end of the car facilitates assembly and the present invention requires no change in the overhang of the car, i. e., the distance between the center of the bolster and the adjacent end sill may be the same as that generally employed today. The bolster is strong, easily formed, and is fully protected against shear.

Novel means are provided for holding the inner end of the resilient means against movement in one direction and said means are so constructed that openings do not have to be provided in the bolster for the spring stop members. Such an arrangement enables a simpler design to be employed in the construction of the bolster.

Novel means are employed for associating the coupler mechanism with the center member and the resilient means. Preferably the structure is such that movement of the coupler relative to the center member is resisted by each of the adjacent resilient members although it is to be expressly understood that, if desired, only one resilient member need be employed at each end of the car. The coupler means may be so constructed that excessive blows are not thrown directly on the coupler key but may be transmitted entirely through the striking plate to the center member. If desired, however, the key 22 may be employed to directly receive said blows. Various changes may be made in the details of construction. For example, the yoke 9, follower 29, and follower 30 may be lengthened or shortened to vary the length and consequently the capacity of the resilient means employed. Preferably the resilient means is installed with an initial predetermined compression. Reference will therefore be had to the appended claims for a definition of the limits of the invention.

What is claimed is:—

1. A car structure comprising a bolster having an opening therethrough, a center draft member mounted for movement relative to said bolster, the travel of said draft member being longer than standard without an increase of train slack, resilient means in said opening for resisting relative movement of the member, and means operatively secured to the bolster and projecting inwardly from the inner face of the latter for preventing movement of said resilient means in one direction.

2. In a car structure, the combination with side sills and an end sill, of a bolster secured to the side sills at a predetermined distance from the end sill, a center member extending substantially the length of the car and mounted for longitudinal movement relative to said bolster, and longitudinally extending means positioned adjacent the end sill and having a length greater than the distance between the center of said bolster and the end sill for resisting relative movement of said center member.

3. In a car structure comprising a bolster having an opening extending transversely through the center thereof, a center draft member mounted for movement relative to said bolster, said draft member extending substantially the length of the structure, means including couplers connected to the opposite ends of the draft member, the couplers being adapted for movement of limited extent relative to the center member and resilient means in said opening for resisting relative movement of the center member, the latter being adapted for movement relative to the bolsters in an amount greater than the movement of the couplers relative to the center member.

4. In a car structure comprising a bolster having an opening extending transversely through the center thereof, a center draft member mounted for movement relative to said bolster, the center draft member extending substantially the length of the structure, couplers movably connected to the opposite ends of the draft member, means including a member movable in said opening, and resilient means for resisting relative movement of the center member, the movement of the couplers relative to the center member being less than the movement of the center member relative to the bolster.

5. In a car structure comprising a bolster having an opening therethrough, a center draft and buffing member adapted for movement relative to said bolster, couplers movably connected to the opposite ends of the draft and buffing member, resilient means in said opening for resisting movement of the center member, and follower means engaging said resilient means and having a portion located between the inner face of the bolster and the opposite end of the structure the movement of the center member relative to the bolster being of larger extent than the movement of the couplers relative to the center draft and buffing member.

6. A car structure comprising a bolster, a long travel center member mounted for movement relative to said bolster, said member extending substantially the length of the car structure and a resilient member extending on the opposite sides of a vertical plane passing longitudinally through the center of the bolster for resisting relative movement of the center member.

7. In a car structure comprising a bolster having an opening therethrough, a center draft and buffing member mounted for movement relative to said bolster, and extending substantially the length of said structure, couplers movably connected to the opposite ends of said center member, the movement of the couplers relative to the center member being less than the movement of the center member relative to the bolster and resilient means extending through said opening for resisting relative movement of the center member.

8. In apparatus of the class described comprising a bolster having an opening therethrough, a long travel center sill mounted for longitudinal movement relative to said bolster, means in said opening for resisting relative movement of said center sill, and follower means slidably mounted in said opening and having a portion normally extending inwardly from the inner face of said bolster for preventing movement of said means in one direction.

9. In a car structure comprising a bolster having an opening therethrough, a center draft member mounted for movement of large extent relative to said bolster, means including couplers operatively connected to the opposite ends of said draft member, said couplers having movement relative to the draft member of less extent than the movement of the draft member relative to the bolster, stop means secured to said member, and means extending through said opening for yieldingly resisting relative movement of said center member, said means including a follower normally having engagement with said stop means at a point laterally spaced from said bolster and a follower normally having engagement with the car structure.

10. In a car structure comprising a bolster having an opening therethrough, a long travel center member extending substantially the length of the car structure and mounted for movement relative to said bolster, resilient means extending through said opening and adapted to yieldingly resist relative movement of said center member, and means operatively secured to said bolster for holding said resilient means against movement in one direction when the center member moves, relative to the bolster, from normal position.

11. A car structure comprising a bolster having an opening therethrough, a center member extending substantially the length of car mounted for movement relative to said bolster, means including couplers operatively connected to the opposite ends of said center member, said couplers having limited movement relative to the center member, resilient means extending through said opening for resisting relative movement of the center member, and means having sliding engagement with said bolster and adapted for engagement with the resilient member at a point laterally spaced from the inner face of said bolster for preventing movement of said resilient means in one direction.

12. In a car structure comprising a bolster having an opening therethrough, a center sill mounted for movement relative to said bolster, couplers movably connected to the opposite ends of the center sill, the latter constituting a draft and buffing column, a follower member extending through the opening in said bolster, and resilient means having engagement at one end thereof with said follower means for yieldingly resisting relative movement of the center sill.

13. A car structure comprising a bolster having an opening therethrough, a long travel center draft and buffing member extending substantially the length of the car structure and mounted for movement relative to said bolster, follower means having a portion normally projecting from the inner face of the bolster and having a flanged portion adapted to engage the bolster, resilient means engaging said follower means for yieldingly resisting relative movement of the center member, and stop means secured to the center member and normally having engagement with said follower means.

14. A car structure comprising a bolster having an opening therethrough, a long travel center draft and buffing member extending substantially the length of the car structure and mounted for movement relative to said bolster, resilient means having a portion in said opening for resisting relative movement of the center member, a follower slidably mounted in said opening and having a portion extending laterally from one face of said bolster the follower having engagement with said resilient means, and stop means secured to the center member and adapted to engage said follower.

15. A car structure comprising a bolster, a long travel center draft and buffing member extending substantially the length of the car structure and mounted for movement relative to said bolster, a plurality of resilient elements having operative connection at one end thereof with said bolster, coupler means secured to the center member and adapted for movement relative thereto, and a member interposed between said resilient elements and the coupler means for transmitting movement of the coupler means relative to the center member to said resilient elements.

16. A car structure comprising a bolster, a long travel center member mounted for movement relative to said bolster, the movement of the center member being longer than standard travel without an increase of train slack coupler means carried by the center member and adapted for movement relative thereto, a plurality of concentrically disposed springs for resisting relative movement of the center member, and means interposed between the coupler means and the resilient members whereby movement of the coupler means relative to the center member is resisted by each of said resilient members.

17. A car structure comprising a bolster having a plurality of openings therethrough, a center member extending substantially the length of the car structure and constituted by channels which extend through two of said openings, said center member being adapted for movement relative to said bolster, and means extending through an opening in the bolster intermediate the channel openings for yieldingly resisting relative movement of the center member.

18. A railway car structure comprising a bolster having three openings therethrough, a center sill extending substantially the length of the car constituted by a plurality of elements mounted for movement relative to said bolster, said elements extending through two of said openings, and means extending through the third opening for yieldingly resisting relative movement of the center member.

19. A railway car structure comprising a bolster having three openings therethrough, a long travel center member extending substantially the length of the car structure and composed of a plurality of elements mounted for movement relative to said bolster, said elements extending through two of said openings, and resilient means for resisting relative movement of the center member, a portion of said resilient means extending into the third opening in the bolster.

20. A body bolster for a railway car comprising a casting having a plurality of openings therethrough, two of said openings being substantially U-shaped, and means intermediate said U-shaped openings and another of said openings for preventing excessive deflection of said bolster in a vertical plane.

21. A bolster for a railway car comprising a casting having a plurality of openings therethrough, two of said openings being substantially similar in outline, a center pin boss projecting upwardly from the lower surface of the bolster and terminating below the lower edge of another of said openings, and a plurality of transverse vertically disposed webs for strengthening the bolster, said webs being provided adjacent said two first-named openings.

22. In a car structure, a long travel center member extending substantially the length of the structure, a coupler, a key slidably connecting said coupler to the center member, means including resilient means and a follower for resisting relative movement between the coupler and center member, and means carried by said key and normally having engagement with said follower for transmitting movement of the coupler in one direction, to the adjacent end of said resilient means.

23. In a car structure, a long travel center member extending substantially the length of the structure, a coupler, a key slidably connecting said coupler to the center member, means including a follower for resisting relative movement between said coupler and center member, a member carried by the key and adapted to engage said follower, and means secured to the center member and having a portion extending between the follower and coupler for positively limiting movement of the latter in one direction relative to the center member.

24. In a car structure, a long travel center member extending substantially the length of the structure, a coupler, a key slidably connecting said coupler to the center member, means including a follower for resisting relative movement between said coupler and center member, a member carried by the key and having arms adapted to engage said follower, and a striking plate secured to the center member for positively limiting movement of the coupler in one direction relative to the center member.

25. In a car structure, a bolster, a member having operative connection with said bolster and projecting laterally therefrom, a center draft and buffing member mounted for movement relative to said bolster and extending substantially the length of said structure, couplers movably connected to the opposite ends of said center member, and resilient means having operative engagement with said first named member and with said draft and buffing member for resisting relative movement of the latter, said resilient means extending substantially horizontally from the opposite side of the bolster from the one on which said first named member projects.

26. In a car structure, a bolster, a center draft and buffing member extending substantially the length of said structure and mounted for movement relative to said bolster, couplers movably connected to the opposite ends of the center member, the movement of the couplers relative to the center member being less than the movement of the center member relative to the bolster, and yielding means extending from a point closely adjacent one coupler to a point in the rear of the adjacent bolster for resisting relative movement of the center draft and buffing member.

27. A car structure comprising a bolster, a center draft and buffing member extending substantially the length of said structure and adapted for movement relative to said bolster, coupler means including a coupler operatively connected to said center draft and buffing member, and a continuous resilient member extending from a point in front of the bolster and closely adjacent the coupler to a point in the rear of the center line of said bolster for resisting movement of the coupler relative to the center member and for resisting movement of the center member relative to the bolster.

28. In a car structure, a long travel center member extending substantially the length of the structure, a coupler, a key slidably connecting said coupler to the center member, means including resilient means and a follower for resisting relative movement between the coupler and center member and the car structure, and means carried by said key and normally having engagement with said follower for transmitting force from the coupler to the follower.

29. In a car structure, a long travel center member extending substantially the length of the structure, a coupler, a key slidably connecting said coupler to the center member, means including a follower for resisting relative movement between said coupler and center member and the car structure, a member carried by the key and adapted to engage said follower, and means secured to the center member and having a portion extending between the follower and coupler for positively limiting movement of the latter in one direction relative to the center member.

30. In railway draft rigging, sills movably mounted in guides on the underframe, resilient means mounted between said sills, a rear follower for said resilient means, a backstop for said follower mounted between said sills, stop means on the underframe engaging said follower upon movement of the sills with respect to said stop means in one direction, a coupler, a key connecting said coupler and sills for permitting limited relative movement therebetween, and a front follower engaged by said coupler and disposed between it and said resilient means, the movement of said follower being yieldably resisted by said means.

31. In railway draft rigging, sills movably mounted with respect to the underframe, resilient means mounted between said sills, a rear follower for said resilient means, a backstop for said follower mounted between said sills, stops means on the underframe extending between said sills and engaging said follower upon movement of the sills with respect to said stop means in one direction, a coupler, a key extending through said coupler and sills permitting limited relative movement therebetween, a front stop member disposed between said sills, a front follower positioned between said stop member and resilient means, and means extending from the rear of said coupler to transmit force to the front follower upon inward movement of the coupler.

32. In railway draft rigging, sills movably mounted with respect to the underframe, resilient means disposed between said sills, a rear follower for said resilient means, a backstop for said follower mounted between said sills, stop means on the underframe engaging said follower to stress the resilient means upon movement of the sills with respect to the underframe in one direction, a coupler, means connecting said coupler and sills and permitting limited relative movement therebetween, and means between said coupler and resilient means to yieldingly resist movement of the coupler with respect to the sills.

33. In railway draft rigging, sills slidably mounted with respect to the underframe, springs mounted between said sills, front and rear followers for said springs, a backstop for said rear follower mounted between said sills, sill tie means outwardly of said first follower, stop means on the underframe engaging said followers upon relative movement of the sills, a coupler, a key extending through said coupler and sills permitting limited relative movement therebetween, and means extending from the rear of said coupler to transmit force to the front follower and move it from the sill tie means on the sills upon inward preliminary movement of the coupler.

34. In railway draft rigging, sills mounted for longitudinal movement with respect to an associated underframe, means disposed between said sills for cushioning relative movement thereof with respect to said underframe, a front follower for said cushioning means, a casting mounted between and connecting the ends of said sills, a coupler with its stem housed in said casting, and means intersecting said stem, casting and sills for transmitting forces therebetween, said coupler including a rearwardly extending portion passing through an aperture in said casting for transmitting forces to said cushioning means.

35. In railway draft rigging, sills guided for longitudinal movement with respect to an associated underframe, cushioning means mounted between said sills, a rear follower for said cushioning means, means connected to said sills and movable therewith for communicating draft movement to said rear follower, means on the underframe engaging said follower upon movement of the sills with respect thereto in one direction for stressing said cushioning means, a coupler, a key passing through slots in said coupler and sills, said slots being elongated for permitting limited relative movement of the coupler with respect to said sills, and a front follower normally engaged by said coupler and disposed between it and said cushioning means, whereby rearward movement of said coupler and follower with respect to said sills is yieldably resisted by said cushioning means.

36. In railway draft rigging, sills slidably longitudinally with respect to an associated railway vehicle underframe, cushioning means disposed between said sills, a rear follower for said cushioning means, means connected to said sills for transmitting draft movement therefrom to said rear follower, means connected to the underframe and adapted to stress the cushioning means upon movement of the sills with respect to the underframe in one direction, a coupler, means connecting said coupler and sills and loosely mounted in said sills for permitting limited relative movement of the coupler, and means disposed between the coupler and cushioning means to transmit forces therebetween to enable said cushioning means to resist buffing movement of the coupler with respect to said sills.

37. In a railway car structure, a body bolster, a continuous draft member mounted for movement relative to said bolster, yielding means for resisting relative movement of the draft member, a striking plate secured to the draft member and movable therewith, a follower for said yielding means, means including a coupler shank operatively connected to said striking plate, and means interposed between said follower and shank and having a plurality of slidable portions for transmitting movement of the shank to said follower plate.

38. In a car structure of the continuous, relatively movable draft member type, a striking plate fixedly secured to said draft member, yielding means for resisting movement of said draft member, a follower for said yielding means, a coupler having a shank mounted for movement relative to said striking plate, and means interposed between said shank and said follower and having a plurality of portions extending through said striking plate for transmitting movement of the coupler shank to the follower.

39. In a car structure, a center member extending substantially the length of said structure and mounted for movement relative thereto, means for yieldingly resisting relative movement of the center member, a striking plate for said center member, a coupler having a shank, means slidably connecting said striking plate and shank, a member interposed between said shank and striking plate, and slidably mounted follower means having operative engagement with said last named member whereby movement of the coupler shank is transmitted to said yielding means.

In testimony whereof I have signed this specification.

OTHO C. DURYEA.